3,483,985
FLIP-TOP AQUARIUM FILTER
Herbert R. Axelrod, Deal, N.J., assignor to T.F.H. Publications, Inc., Jersey City, N.J., a corporation of New York
Filed Oct. 13, 1967, Ser. No. 675,229
Int. Cl. B01d *35/16, 35/28*
U.S. Cl. 210—169                                            1 Claim

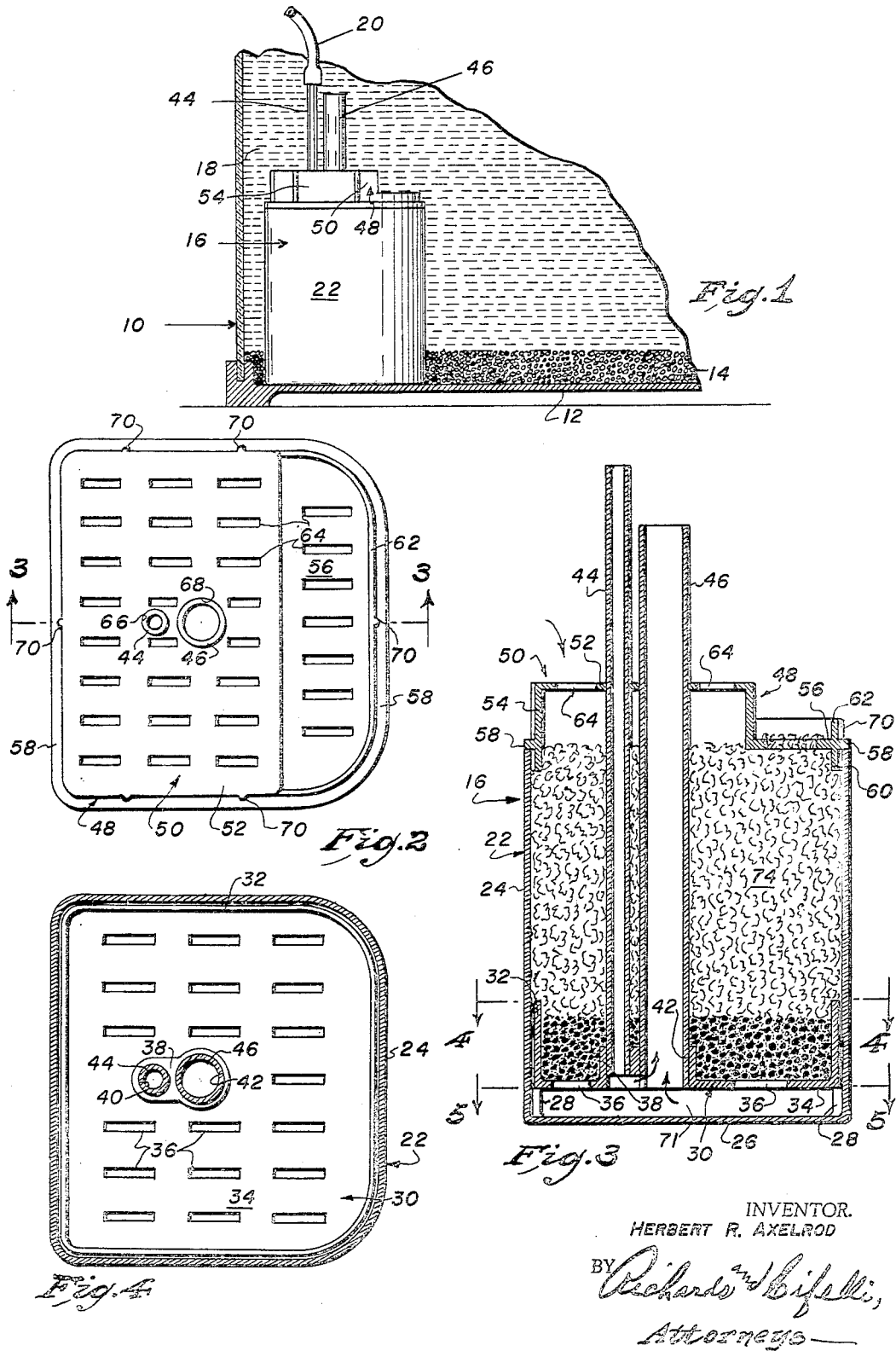

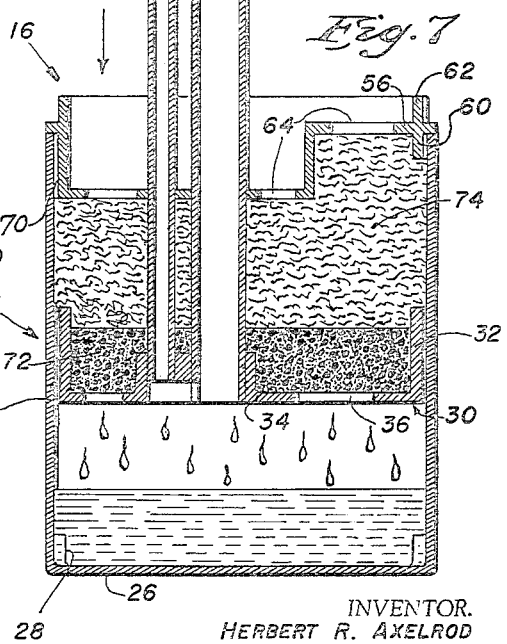

ABSTRACT OF THE DISCLOSURE

An aquarium bottom filter including a housing and a cap-shaped invertible top whose crown portion extends into the housing to serve as a dirt trap when in a first position and protrudes from the housing to prevent clogging of the filtering material when in a second position.

BACKGROUND OF THE INVENTION

My invention relates to a bottom aquarium filter and more particularly to such a device having a multipurpose invertible top.

The circulation, purification and aeration of aquarium water is necessary for the well being of the fish living therein. Since it is impractical to replace the water in an aquarium except at long intervals of time, filters have been devised which may be disposed within an aquarium to continuously clean the water. The process of cleaning entails the removal of solid fish waste and other foreign organic matters, such as uneaten food particles, which, if they remain in the aquarium, will decay and foul the water. This is accomplished by the continual passage of the water through a filtering media, generally glass wool or a synthetic cotton-type batting, housed within a filter tank.

A major problem encountered with the usual filters is that the amateur aquarist normally overfills the filter tank with the glass wool which clogs the usual apertures formed in the top of the filter tank, hampering the free flow through the device.

Another disadvantage of the usual aquarium bottom filters is that the accumulations of solid fish waste and other organic waste rapidly forms a mucky layer upon the surface of the glass wool hampering the filtering process necessitating the frequent replacement of this material which when dirty is unpleasant to handle.

SUMMARY OF THE INVENTION

Accordingly, I have provided a flip-top aquarium bottom filter having a top designed to reduce the likelihood of substantial blocking of the top apertures when mounted in one position and to provide an easily cleaned dirt trap when mounted in a second position.

Another object is to provide an improved aquarium bottom filter which is inexpensive to manufacture and is easily manipulatable by amateur aquarists.

To accomplish these objects, in one form, I have provided a bottom filter device including a housing having side and bottom walls, a bottom tray having a grated bottom wall being positionable within the housing with the bottom wall parallel to and spaced from the housing bottom wall and defining a chamber therebetween, a grated top positionable upon the housing side walls and including a dirt tray protruding into the housing. A mass of filtering material is placed in the housing between the bottom tray and the top and pumping means are connected to the chamber for drawing water through the filtering material.

BRIEF DESCRIPTION OF THE DRAWINGS

Other objects and further details of that which I believe to be novel and my invention will be clear from the following description and claim taken with the accompanying drawings wherein:

FIG. 1 is a side elevational view of my improved filter shown on the bottom of an aquarium tank;

FIG. 2 is a top plan view of my filter;

FIG. 3 is a sectional view taken substantially along line 3—3 of FIG. 2 showing the filter top in one position;

FIG. 4 is a sectional view taken substantially along line 4—4 of FIG. 3;

FIG. 5 is a sectional view taken substantially along line 5—5 of FIG. 3;

FIG. 6 is a longitudinal sectional view showing the top in a second position; and FIG. 7 is a longitudinal sectional view showing the manipulation of the filter parts to express dirty water from the filter media.

DESCRIPTION OF THE PREFERRED EMBODIMENT

Referring now to the drawings there is illustrated in FIG. 1 an aquarium tank 10 having a bottom 12 upon which a layer of gravel 14 may be deposited. My improved filter tank 16 rests upon the bottom 12 immersed in the water 18 and is connected to an air supply hose 20 which receives air from a usual pump. The filter tank 16 includes a housing 22 having side walls 24, a bottom wall 26 and a plurality of support formations 28 disposed on the side walls extending upwardly from the bottom wall. The housing is generally rectangular in cross section as viewed in FIG. 5 with two of its corners rounded to insure that the nesting members to be described may be properly inserted to cooperate with one another.

One of the nesting members is a cup-shaped bottom tray 30 having side walls 32, a bottom wall 34 with a plurality of slots 36 defining a grate and an upwardly extending boss 38 having a small diameter aperture 40 and a larger diameter aperture 42 formed therethrough. An air inlet pipe 44 is firmly supported in the smaller aperture 40 and an air-and-water outlet pipe 46 is firmly supported in the large aperture 42.

The second nesting member is a unique invertible top 48 which is generally cap-like in cross section as viewed in FIG. 3 and comprises a crown portion 50 having a planar end wall 52 with side walls 54, a brim portion 56, a peripheral flange 58, a peripheral skirt 60 extending in the opposite direction from the crown portion and a lip 62 forming a mirror image of the skirt on the brim. A plurality of slots 64 define grates in the planar end wall 52 and brim portion 56, and apertures 66 and 68 are defined in the planar end wall 52 to receive the inlet pipe 44 and the outlet pipe 46 respectively. Friction lugs 70 are formed on the exterior surfaces of the side walls 54, the flange 48 and the skirt 60 to hold the top in place when it is mounted on the housing 22.

As shown in FIG. 1 the filter tank 16 rests upon the bottom of the aquarium tank 10 so that the dirt particles may descend freely to it. The bottom tray 30 with the pipes 44 and 46 in place slides into the housing 22 and rests upon the support formations 28 which space it from the bottom wall 26 to define a chamber 71. The bottom tray 30 may be filled with a suitable purifying material such as charcoal granules 72 and a mass of fibrous filtering material 74 such as glass wool or a synthetic cotton-like batting is loosely placed over the charcoal in the tray and about the pipes 44 and 46. The top 48 is then placed upon the body in one of two positions to be described to perform its several unique functions.

In the operation of the filter, air is pumped through the supply hose 20 into the inlet pipe 44. The air travels down the inlet pipe to the chamber 71 and emerges from the filter to the aquarium tank through the outlet pipe 46. The air draws water upwardly through the outlet pipe thus producing a pumping action to draw the dirt laden water from the aquarium through the grated top 48 into the filtering media. Clean water emerges from the grated bottom wall 34 of the bottom tray into the chamber 71 and passes upwardly into the aquarium.

In FIG. 3 the top 48 is mounted on the side walls 24 with the skirt 60 disposed in the housing, the flange 58 limiting engagement between these two parts. In this manner, the crown portion 50 protrudes from the housing while the brim portion 56 is substantially coplanar with the rim of the side walls. If the housing has been overfilled with the fibrous filtering material 74 the brim portion will tamp it down and prevent clogging of the entry slots 64 of the crown portion. As can be seen by reference to the brim portion 56, the entry slots 64 thereof are clogged by the material 74 protruding therethrough in the manner of the usual filter tops. Inasmuch as these slots 64 of the brim portion are necessary to permit entry of the dirt laden water from the aquarium the efficiency of the filter is reduced. However, the raised crown portion 50 provides additional internal space and allows the dirt laden water to enter the filter tank and dissipate the solid particles upon the entire upper surface of the fibrous filtering material 74.

Referring now to FIGS. 6 and 7 I have illustrated the inverted position of the top 48 wherein the crown portion 50 extends into the housing 22. In this position the advantage described above, with reference to the FIG. 3 position, is lost so that the aquarist must take care not to overfill the housing with the filtering material 74. The dished crown portion 50 now serves as a dirt trap to capture the mucky accumulated particulate matter which builds up as a layer 76. In the usual filters this mucky layer builds up upon the upper surface of the fibrous filtering material which material must therefore be replaced frequently and is unpleasant to handle. When the layer of particulate matter has accumulated to a depth of approximately one-quarter inch in the dirt trap of my top, the aquarist need only detach the air supply hose 20 from the air inlet pipe 44 and lift the top with the dirt layer from the housing 22 and remove it from th aquarium, being careful not to disperse the dirt back into the water. The top 48 may then be held under a running faucet to wash the dirt layer 76 out of the crown portion. The top is replaced on the housing and the air hose is again connected to the air pipe 44. In this manner the filter has been substantially cleaned without having to replace the fibrous filtering material 74 allowing the aquarist to leave the filtering material in the filter for several months rather than for a week or two as was previously the case.

When it does become necessary to replace the filtering material 74 the filter 16 is removed from the aquarium tank and whereas the usual procedure has been for the aquarist to handle the soaked, soiled filtering material my improved filter allows the aquarist to handle a relatively dry mass of the filtering material. This may be accomplished with the top in either the FIG. 3 or FIG. 6 position and is illustrated in FIG. 7 wherein the top 48 is held in place on the housing 22 with one hand while the other hand lifts the bottom tray 30 by pulling upwardly upon the pipes 44 and 46. This compresses the filtering material 74 thus expressing water therefrom.

The top is then removed, the relatively dry filtering material is dropped off to obviate the need for handling it, and the expressed dirty water is poured out of the housing.

Having described my invention of a flip-top aquarium filter it will be readily appreciated by those skilled in this art that a filter embodying my invention is simple in design, low in cost and ingenious in operation. It should be understood that the present disclosure has been made only by way of example and that numerous changes in details of construction and the combination and arrangement of parts may be resorted to without departing from the true spirit and the scope of the invention.

What I claim as new and desire to secure by Letters Patent of the United States is:

1. A bottom filter for an aquarium, comprising:
   an open-topped housing having a bottom and side walls;
   a cup-shaped bottom tray having a slotted bottom wall and upstanding side walls telecopically disposed in the bottom portion of said housing;
   vertical, elongated tube means having their lower ends affixed to the bottom wall of said bottom tray;
   a generally cap-like top that includes a crown portion having a horizontal planar end wall formed with water passage slots and side walls depending from said end wall, a horizontal brim portion formed with water passage slots spaced axially from said end wall, a peripheral skirt extending axially in the opposite direction from said crown portion and a lip forming a mirror image of said skirt on said brim, said top being coaxially selectively disposed upon the upper end of said housing with said crown portion either extending upwardly or downwardly, and said planar wall being apertured to slidably receive said tube means, with the interior of said crown portion serving as a dirt trap when said crown portion extends downwardly;
   friction lugs formed on the upper portion of said housing to removably hold said top in place;
   and filtering material supported on said bottom tray, with said bottom tray being movable towards said top by means of said tube means as said top is manually restrained against upward movement to thereby squeeze dirty water out of said filtering material, and said bottom tray, filtering material and top then being removable upwardly from said aquarium.

References Cited

UNITED STATES PATENTS

| 2,782,161 | 2/1957 | Willinger et al. | 210—169 |
| 3,145,168 | 8/1964 | Scafulo | 210—169 |

SAMIH N. ZAHARNA, Primary Examiner

T. A. GRANGER, Assistant Examiner

U.S. Cl. X.R.

210—351